Patented Mar. 7, 1939

2,149,999

UNITED STATES PATENT OFFICE 2,149,999

LIGHTLY COATED MANGANESE STEEL ELECTRODE

Walter B. Lair, Scotia, N. Y., assignor to General Electric Company, a corporation of New York No Drawing. Application December 9, 1936, Serial No. 115,056

5 Claims. (Cl. 219—8)

My invention relates to arc welding fluxes and more particularly to flux coated metallic arc welding electrodes.

In metallic arc welding an arc is maintained between the work to be welded and a rod or strip of metal usually referred to as an electrode. During welding the electrode is fused or vaporized or both, and the metal thereof deposited upon and united with the work as the electrode is fed toward the work to maintain the arc.

The facility with which the welding arc may be maintained and the quality of the weld metal deposited by such a process depends to a large extent upon the influence of certain elements or compounds associated with the electrode, usually in the form of a coating. Electrodes so coated are commonly referred to as flux coated electrodes.

It is an object of my invention to provide an improved arc welding flux.

It is a further object of my invention to provide a manganese steel electrode having associated therewith a flux with facilitates the maintenance of the welding arc established between it and the work during welding.

It is a further object of my invention to provide a manganese steel electrode having associated therewith a flux which adapts it for use with alternating current as well as with direct current.

I accomplish these results by using a flux, the essential ingredients of which are magnesium silicate and silica and in which from one-half to two parts by weight of silica is used for each part of magnesium silicate. Titanium dioxide may be added to the flux as an arc sustaining ingredient and when so added is preferably present in quantities less than one-fourth of the weight of the magnesium silicate employed.

This flux may be associated with an electrode in any suitable manner either on its surface or within it as a core. When applied to the electrodes as a coating it is mixed with water and a suitable binder such as sodium silicate to form a bath of the proper consistency to create a coating on the electrodes of from .003 to .008 of an inch in thickness when they are dipped into the bath and the coating thus applied dried thereon. The amounts of water and sodium silicate employed will vary depending upon the grade of sodium silicate and the nature and relative quantities of the flux ingredients used.

I have successfully used a flux of the following composition by weight:

| | Per cent |
|---|---|
| Silica | 14.4 |
| Magnesium silicate | 7.2 |
| Sodium silicate | 18.4 |
| Water | 60.0 |

The silica employed was an amorphous silica of the type known commercially as snow-floss and the magnesium silicate was of the type known as asbestine. Both of these ingredients were used as fine powders. The sodium silicate employed contained about 40% solid matter in which the ratio of $Na_2O$ to $SiO_2$ was about 1 to 2.

For welding austenitic manganese steel, I prefer to use an electrode of substantially the following composition:

| | Per cent |
|---|---|
| Manganese | 12.00 to 15.00 |
| Carbon | .60 to 1.30 |
| Nickel | 2.75 to 5.00 |
| Silicon | .50 to 1.75 |
| Phosphorus, maximum | .10 |
| Sulphur, maximum | .10 |
| Iron | Remainder |

The value of austenitic manganese steel is due to its very great toughness and ability to harden under cold working. A steel containing from ten to fifteen per cent manganese can be made austenitic by heat treatment or by the addition of nickel. Electrodes of the composition specified above are suitable for welding plates and structures of austenitic manganese steel without destroying their properties. The presence of the nickel in the electrodes gives an air toughening deposit. It also impregnates the transition zone between the deposit and the parent metal, making it susceptible to air toughening and thus avoids damage to the austenitic structure of the parent metal. The silicon in the electrodes is important in preventing the formation of blow holes.

Electrodes of the above composition provided with the particular flux coating above described will give a metal deposit having a hardness of 163–179 Brinell. After peening with a hammer, the hardness may readily be increased to 311–

341 Brinell. If a sufficient amount of peening is employed the hardness may be built-up to 450 Brinell. The metal deposited on manganese steel showed about 12 to 20% elongation before failure.

When using a direct current source of welding current, the electrode should be connected to the positive terminal. It is desirable to perform the welding operation in a manner to avoid concentrating a high temperature at any one spot for too long a time since the accumulation of heat will destroy the austenitic properties of the parent metal being welded.

The slag produced by my improved flux is very thin, and in no way interferes with the air toughening of the metal deposited by the electrode.

My flux is used primarily for its effect on the arc, and an improved weld deposit results primarily from the improved operating characteristics of the welding arc which enables the operator to perform the welding operation more uniformly than would otherwise be possible. A very important advantage of using my particular flux results from the ability to use an alternating current source of supply for performing the welding operation. Electrodes coated with my improved flux are thus suited for welding with both direct current and alternating current sources.

What I claim as new and desire to secure by Letters Patent of the United States is:

1. An arc welding flux the essential ingredients of which are one part by weight of magnesium silicate to one-half to two parts by weight of silica.

2. An arc welding electrode having associated therewith a flux consisting essentially of one part by weight of magnesium silicate to one-half to two parts by weight of silica.

3. An arc welding electrode having associated therewith a flux consisting essentially of one part by weight of magnesium silicate to one-half to two parts by weight of silica and containing titanium dioxide in quantities not greater than one-quarter of the weight of the magnesium silicate present therein.

4. An arc welding electrode having associated therewith a dry flux having substantially the following initial composition:

| | Per cent by weight |
|---|---|
| Silica | 14.4 |
| Magnesium silicate | 7.2 |
| Sodium silicate | 18.4 |
| Water | 60.0 |

5. An arc welding electrode of substantially the following composition:

| | Per cent |
|---|---|
| Manganese | 12.00 to 15.00 |
| Carbon | .60 to 1.30 |
| Nickel | 2.75 to 5.00 |
| Silicon | .50 to 1.75 |
| Phosphorus, maximum | .10 |
| Sulphur, maximum | .10 |
| Iron | Remainder | having applied to its surface a coating of dry flux of from .003 to .008 of an inch in thickness, said coating having substantially the following initial composition:

| | Per cent by weight |
|---|---|
| Silica | 14.4 |
| Magnesium silicate | 7.2 |
| Sodium silicate | 18.4 |
| Water | 60.0 |

WALTER B. LAIR.